United States Patent [19]
de Morais Zoio et al.

[11] Patent Number: 5,205,121
[45] Date of Patent: Apr. 27, 1993

[54] SYSTEM FOR COLLECTING FRUIT FROM TREES

[76] Inventors: Luis G. de Morais Zoio; Johanna W. van Mourik, both of Rua Candido dos Reis, Lote 4, Carcavelos, Portugal

[21] Appl. No.: 729,319

[22] Filed: Jul. 15, 1991

[30] Foreign Application Priority Data

Jul. 16, 1990 [PT] Portugal ............................... 94709

[51] Int. Cl.$^5$ ............................................. A01D 46/24
[52] U.S. Cl. ...................... 56/328.1; 56/329; 56/340.1
[58] Field of Search ................. 56/328.1, 329, 340.1, 56/DIG. 2, 1

[56] References Cited

U.S. PATENT DOCUMENTS

| | | | |
|---|---|---|---|
| 3,496,705 | 2/1970 | Perrelli | 56/328.1 |
| 3,635,004 | 1/1972 | Webb et al. | 56/340.1 X |
| 4,545,187 | 10/1985 | Landgraf | 56/329 |
| 4,901,514 | 2/1990 | del Morais Zoio | 56/329 X |

Primary Examiner—Terry Lee Melius
Attorney, Agent, or Firm—Sterne, Kessler, Goldstein & Fox

[57] ABSTRACT

The present invention concerns a new system for collecting fruit from trees. The fruit is thrown down by compression and decompression of the branches. Because the branches are flexible, the compression induces a uniform and homogenous contracting thereof. The decompression makes the branches return to their original positions and the fruit is released by inertia. The compression is obtained by beating strongly on consecutive sections of the peripheral branches, using soft surfaces fixed on rigid sections framing them. The above-mentioned fixed sections operate manually with the help of springs and ropes or mechanically with appropriate means. In this new system no part of the tree—fruit included—is submitted to strains causing serious damage.

9 Claims, 3 Drawing Sheets

SYSTEM FOR COLLECTING FRUIT FROM TREES

BACKGROUND OF THE INVENTION

1. Field of the Invention

The present invention relates to a non-vibratory system for beating trees and collecting fruit therefrom, and more particularly, for collecting olives, although it can also be used for picking almonds or other kinds of fruit such as citrus fruits, coffee, etc.

2. Description of the Related Art

Several methods for picking fruit are already known, ranging from manual to mechanical and chemical methods.

One method for the manual picking and/or collecting of fruit involves beating trees with a stick. One of many drawbacks is that a considerable amount of manual labor is required, which is becoming increasing expensive. Further, this method is rather slow, and this also has a bearing on the final cost of the product. Furthermore, the manual beating of a tree is not uniformly carried out. This may cause serious damage to the tree, to the branches thereof and to the buds of the next generation of fruit, as is the case with olive trees.

The various mechanical methods known may also cause serious damage to the trees. In fact, methods are nowadays used which make trees vibrate from the trunk upwards and in order to obtain the expected results, these vibrations have to be so strong that the whole tree structure is shaken. Other mechanical methods used to the same effect also cause considerable damage to the branches. The methods are, moreover, expensive, requiring sophisticated means.

Chemical methods are also extremely expensive and are only worth using for very large pickings. Also, due to environmental and pollution concerns, these methods require special conditions with regard to application, or at least that special care is taken.

All of these methods require a subsequent picking up of the fruit, this being another drawback of the known procedures.

The present invention completely overcomes all the disadvantages referred to above.

DESCRIPTION OF THE PREFERRED EMBODIMENT

Figure 1:
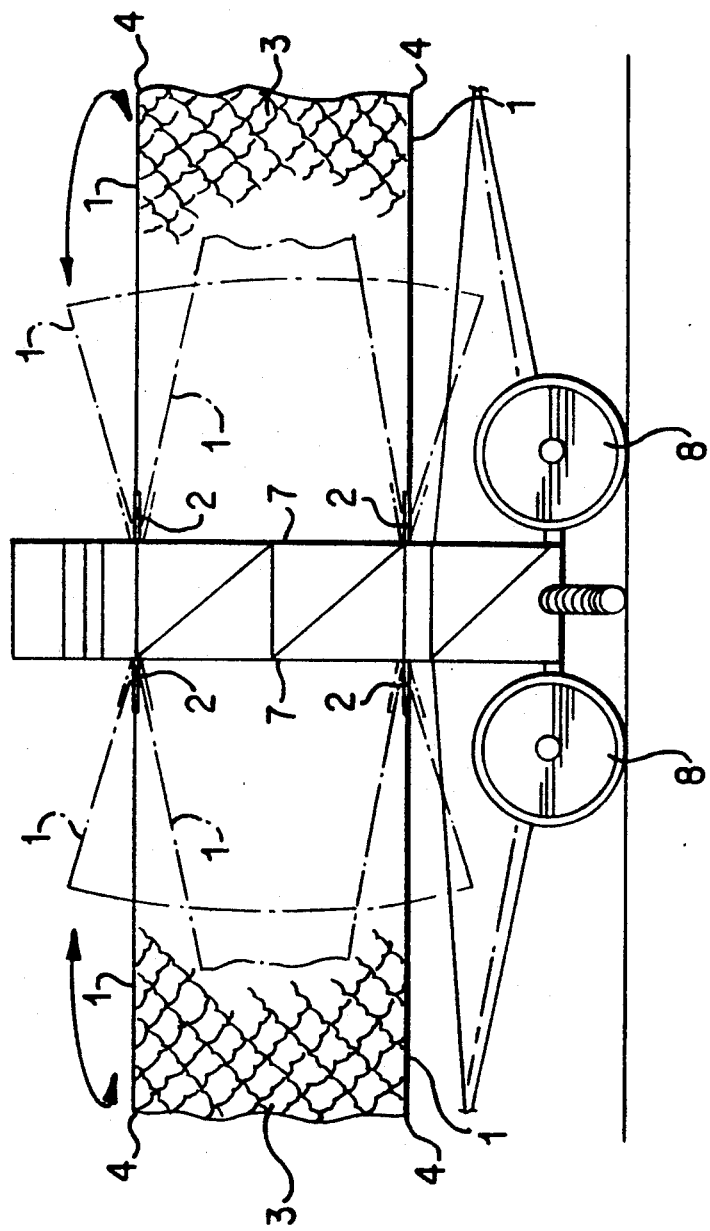
FIG. 1—Lateral view of two operational sets, each one consisting of two rigid surfaces and respective panel consisting of a soft surface. One can see the springs fixing the rigid surfaces to the structure as well as the rope which links the free ends which are to be held by the operator.

As is illustrated in the drawings, the system consists of eight rigid sections (1) which are fixed, in pairs, to the respective left and right side ends of each of the lateral bodies or support structure (7), having an arch type structure (surrounding two sides and the top of the tree from which the fruit is to be picked), by means of strong springs (2) directed alternatively to the upper and lower area of the branches and avoiding thereby the direct contact with the branches themselves.

Each pair of rigid sections, in a total of four pairs, fixed a panel (3) of soft material, namely—a net—thus forming four operational sets.

As shown in FIG. 1, the support structure (7) having an arch-type structure has at the base of each end of the arch a wheel assembly, each assembly having two wheels (8) for mobility.

The free ends (4) of the rigid sections (1) of each pair are linked, by means of a strong rope (5) long enough to allow the operator—who is placed (6) in the back of the lateral body of the structure—to exert pressure on the free ends of the rigid sections, thus opening the whole set. These rigid sections act as a lever on the springs which are located on the other end (principle of the lever).

Afterwards, by releasing the rope, the operator causes the whole set to "go off". This results in a strong compression of the branches, as they are pushed by the soft surface which is itself pulled by the rigid ones.

It is understood that two operators will be needed, each one working on a contiguous set.

Each set operates on 25% of the total of the tree branches and considering that one beat is enough to throw down the fruits of its own section, the system becomes a simple, fast, and efficient one although harmless to the tree itself as well as to its branches and fruits, because it operates by means of the strong and homogeneous compression made by the soft material used thereby, causing the inertia of the fruits and making them separate from the branches and then fall down by gravity.

Figure 2:
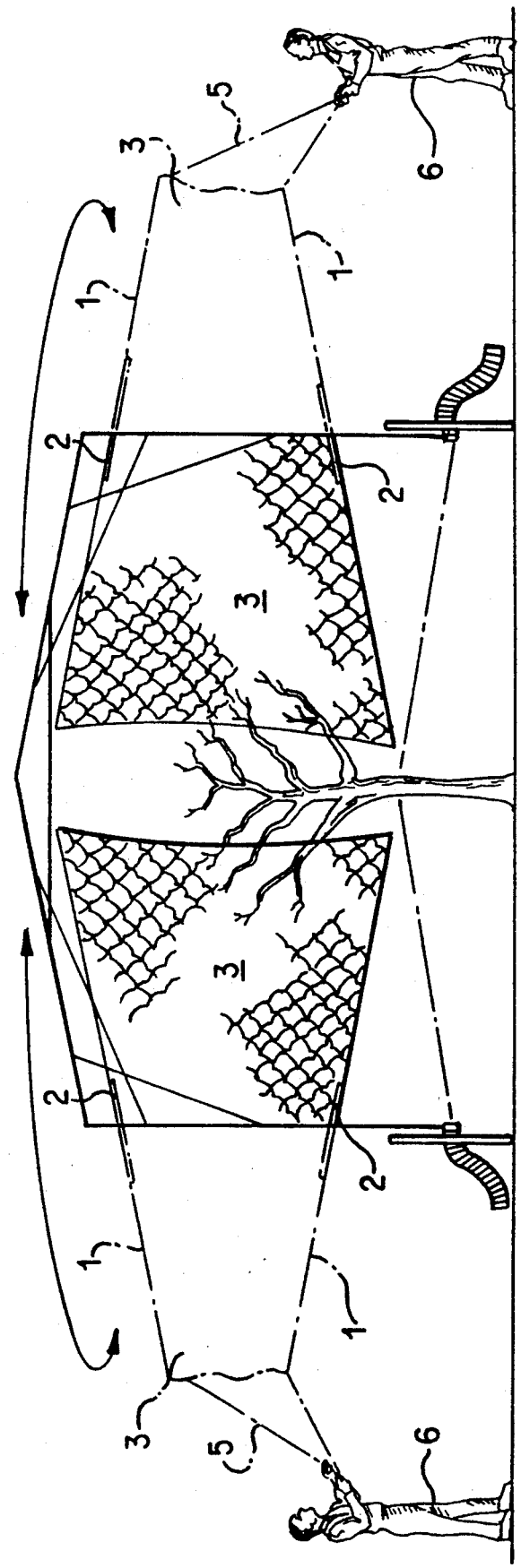
FIG. 2—Front view of two of the four operational sets at rest.
Figure 3:
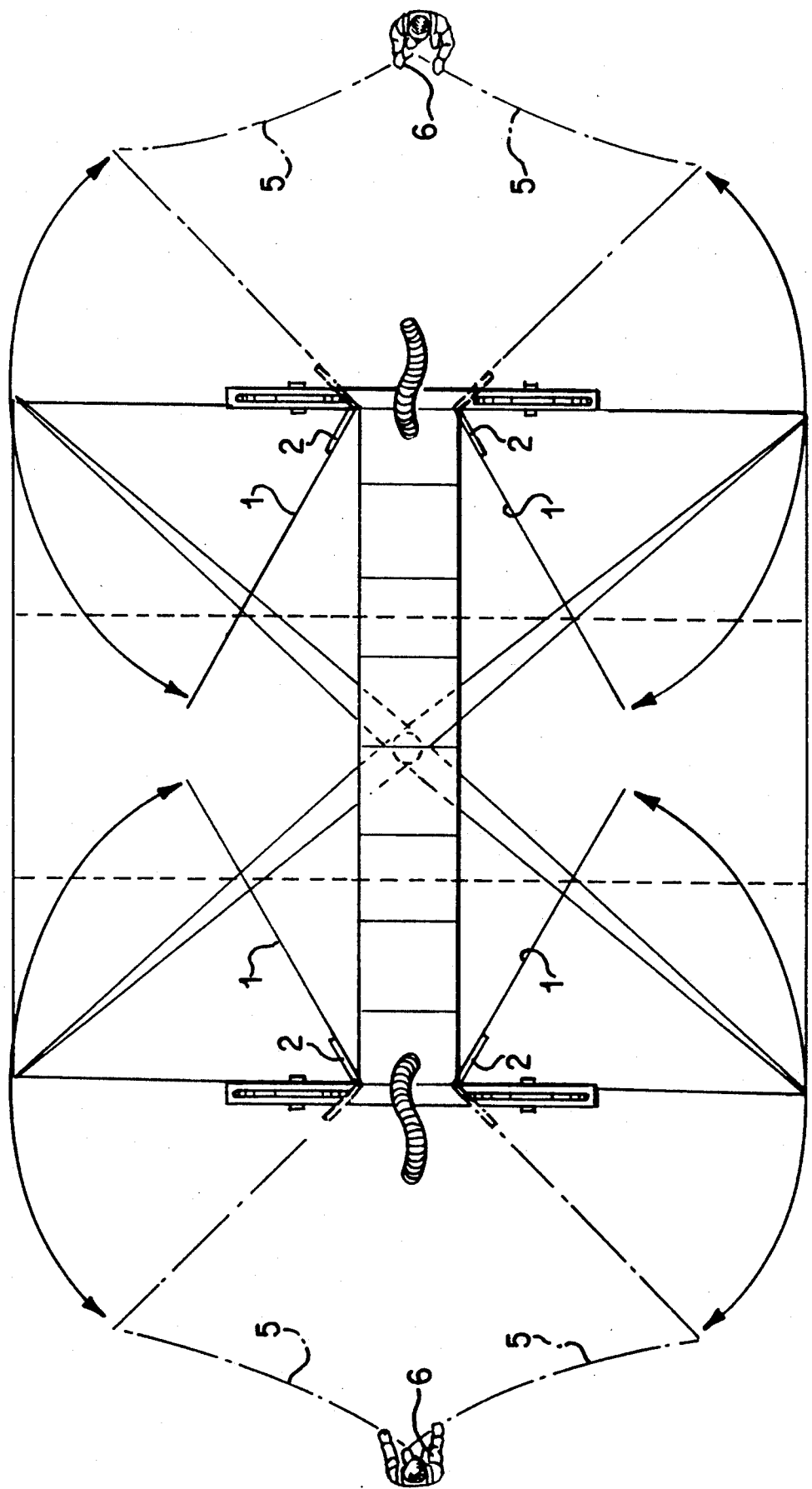
FIG. 3—Top view of four operational sets in operation.

FIG. 3 is a top view of the operation of the apparatus. Unlike FIG. 2 where a tree with branches is depicted, FIG. 3 omits the tree branches and illustrates only the trunk of the tree for clarity.

Various minor modifications could be introduced, based on the details of the preferred embodiments shown and described herein for illustrative purposes, without departing from the real essence of the invention.

Thus, it is intended that the present invention cover the modifications and variations of the picking apparatus in accordance with the invention, within the scope of the appended claims and their equivalents, without limitation as to the different environments in which to use the picking devices.

What is claimed is:

1. An apparatus for collecting fruit from a tree, comprising:
    a plurality of panels surrounding the tree, each said panel including a framing element having a free end and a hinged end, and a flexible material region connected to said framing element;
    a support structure;
    tensioning means linking said hinged end of said framing element to said support structure so that said panels are configured in a biased position; and
    means for manipulating each said panel with respect to said biased position of each said panel.

2. An apparatus for collecting fruit from a tree according to claim 1, wherein said plurality of panels equals four.

3. An apparatus for collecting fruit from a tree according to claim 1, wherein said plurality of panels equals an even number.

4. An apparatus for collecting fruit from a tree according to claim 1, wherein said flexible material region comprises netting.

5. An apparatus for collecting fruit from a tree according to claim 1, wherein said support structure is mounted on wheels.

6. An apparatus for collecting fruit from a tree according to claim 5, wherein said support structure arches over said tree to connect a first and a second base, each said base being mounted on said wheels.

7. An apparatus for collecting fruit from a tree according to claim 1, wherein said tensioning means comprises a spring.

8. An apparatus for collecting fruit from a tree according to claim 1, wherein said means for manipulating comprises:
   releasing means attached to said free end of said framing element whereby said releasing means cause said framing element to pivot about said hinged end and said free end to swing from a deflected position toward said biased position so that said flexible material region contacts the branches of said tree, causing fruit to fall therefrom.

9. An apparatus for collecting fruit from a tree according to claim 8, wherein said releasing means comprises a rope.

* * * * *